United States Patent
Weidemann et al.

(10) Patent No.: US 10,245,949 B2
(45) Date of Patent: Apr. 2, 2019

(54) METHOD FOR OPERATING A MOTOR VEHICLE INCLUDING AN ALL-WHEEL DRIVE THAT CAN BE ENABLED AND DISABLED BY DETERMINING AN ANGULAR ACCELERATION OF COMPONENTS, WHICH ARE UNCOUPLED WHEN THE ALL-WHEEL DRIVE IS DISABLED

(71) Applicant: AUDI AG, Ingolstadt (DE)

(72) Inventors: Dieter Weidemann, Stammham (DE); Heiko Hanickel, Kipfenberg (DE); Florian Kolb, Gößweinstein (DE); Hans Jörg Brühl, Kösching (DE)

(73) Assignee: AUDI AG, Ingolstadt (DE)

( * ) Notice: Subject to any disclaimer, the term of this patent is extended or adjusted under 35 U.S.C. 154(b) by 42 days.

(21) Appl. No.: 15/524,639

(22) PCT Filed: Nov. 6, 2015

(86) PCT No.: PCT/EP2015/075901
§ 371 (c)(1),
(2) Date: May 5, 2017

(87) PCT Pub. No.: WO2016/071491
PCT Pub. Date: May 12, 2016

(65) Prior Publication Data
US 2017/0341511 A1    Nov. 30, 2017

(30) Foreign Application Priority Data
Nov. 6, 2014   (DE) .................. 10 2014 016 376

(51) Int. Cl.
*B60K 25/00* (2006.01)
*B60K 25/08* (2006.01)
(Continued)

(52) U.S. Cl.
CPC .......... *B60K 23/0808* (2013.01); *B60K 23/08* (2013.01); *F16H 61/12* (2013.01);
(Continued)

(58) Field of Classification Search
CPC .... B60K 23/00; B60K 23/08; B60K 23/0808; F16H 61/00; F16H 61/12
See application file for complete search history.

(56) References Cited

U.S. PATENT DOCUMENTS 4,762,191 A    8/1988  Hagin et al.
5,207,483 A    5/1993  Shimada et al.
(Continued)

FOREIGN PATENT DOCUMENTS

CN    101898560 A    12/2010
DE    4208141 A1    9/1992
(Continued)

OTHER PUBLICATIONS

Chinese Office Action dated May 28, 2018, in connection with corresponding Chinese application No. 201580060236.7; 5 pgs.
(Continued)

*Primary Examiner* — Yonel Beaulieu
(74) *Attorney, Agent, or Firm* — Maier & Maier, PLLC

(57) ABSTRACT

A method for operating a motor vehicle including an all-wheel drive that can be enabled and disabled, and a drive train including two clutches actuated by a control unit for enabling and disabling the all-wheel drive, and components rotating between the two clutches, which components are driven when the all-wheel drive is enabled and are uncoupled from the remaining drive train when the all-wheel drive is disabled. In order to allow early detection of defects and, in particular, bearing defects of the rotating components, and to determine the applied drag torque even without knowing the oil temperature, in one embodiment, when the
(Continued)

all-wheel drive is disabled, the rotational speed (n) of at least one of the uncoupled components is measured in a time interval, and an angular acceleration of the uncoupled components is determined therefrom.

9 Claims, 3 Drawing Sheets

(51) Int. Cl.
*F16H 61/12* (2010.01)
*B60K 23/08* (2006.01)

(52) U.S. Cl.
CPC .......... *B60K 2023/0825* (2013.01); *B60K 2023/0833* (2013.01); *B60Y 2400/42* (2013.01); *B60Y 2400/421* (2013.01)

(56) References Cited

U.S. PATENT DOCUMENTS

| | | | | |
|---|---|---|---|---|
| 5,810,693 A * | 9/1998 | Nakayama | ............ | F16H 61/061 477/148 |
| 5,816,950 A * | 10/1998 | Kamada | ............ | F16H 61/061 477/148 |
| 5,919,114 A * | 7/1999 | Kamada | ............ | F16H 61/061 477/143 |
| 6,041,877 A | 3/2000 | Yamada et al. | | |
| 7,048,670 B2 * | 5/2006 | Isoda | ............ | F02D 41/022 123/406.24 |
| 8,340,850 B2 * | 12/2012 | Muta | ............ | B60K 6/445 701/22 |
| 9,188,220 B2 * | 11/2015 | Masunaga | ............ | F16H 61/686 |
| 2003/0033076 A1 * | 2/2003 | Isoda | ............ | F02D 41/022 701/110 |
| 2007/0193793 A1 | 8/2007 | Burrows et al. | | |
| 2010/0089685 A1 | 4/2010 | Quehenberger et al. | | |
| 2013/0245901 A1 * | 9/2013 | Arai | ............ | F16H 61/688 701/51 |
| 2014/0180521 A1 * | 6/2014 | Tsuchikawa | ............ | B60K 6/48 701/22 |
| 2014/0195082 A1 * | 7/2014 | Takamura | ............ | B60L 11/14 701/22 |
| 2014/0228167 A1 * | 8/2014 | Frank | ............ | B60K 6/442 477/5 |
| 2015/0252891 A1 * | 9/2015 | Masunaga | ............ | F16H 61/686 701/51 |
| 2017/0122431 A1 * | 5/2017 | Cho | ............ | F16H 59/56 |

FOREIGN PATENT DOCUMENTS

| | | |
|---|---|---|
| DE | 202009007977 U1 | 2/2010 |
| DE | 102009005378 A1 | 4/2010 |
| DE | 102009053885 A1 | 5/2011 |
| DE | 102010042528 A1 | 4/2012 |
| DE | 102013205107 A1 | 10/2013 |
| DE | 102012020908 A1 | 5/2014 |
| EP | 0 224 144 B1 | 7/1989 |

OTHER PUBLICATIONS

German Examination Report dated Jul. 1, 2015 in corresponding German application DE102014016376.8; 6 pages.
International Search Report dated Feb. 16, 2016 in corresponding International application PCT/EP2015/075901; 4 pages.
Translation of the International Preliminary Report on Patentability dated May 18, 2017, in connection with corresponding international Application No. PCT/EP2015/075901 (6 pgs.).

* cited by examiner

METHOD FOR OPERATING A MOTOR VEHICLE INCLUDING AN ALL-WHEEL DRIVE THAT CAN BE ENABLED AND DISABLED BY DETERMINING AN ANGULAR ACCELERATION OF COMPONENTS, WHICH ARE UNCOUPLED WHEN THE ALL-WHEEL DRIVE IS DISABLED

FIELD

The invention relates to a method for operating a motor vehicle comprising an all-wheel drive that can be enabled and disabled, and a drive train comprising two clutches actuated by a control unit for enabling and disabling the all-wheel drive, and components rotating between the clutches, which are driven when the all-wheel drive is enabled and uncoupled from the remaining drive train when the all-wheel drive is disabled.

BACKGROUND

DE 10 2012 020 908 A1 of the applicant already discloses a method of the aforementioned type for operating a motor vehicle with all-wheel drive, which has a permanently driven primary or front axle and a secondary or rear axle that can be enabled and disabled, the drive of which is enabled and disabled by a control unit as a function of a current driving situation. One of the essential advantages of such an all-wheel drive that can be enabled and disabled exists in the fact that the fuel consumption of the motor vehicle can be minimized by disabling the all-wheel drive when it is not required in order to thereby particularly minimize the power losses or the drag torque of the axle drive of the secondary or rear axle, which can be disabled.

The drive train of the motor vehicle in accordance with DE 10 2012 020 908 A1 comprises a so-called all-wheel clutch in the form of a clutch that is engaged when the all-wheel drive is enabled and the torque provided by the internal combustion engine is distributed to both axles of the motor vehicle and which is disengaged when the all-wheel drive is disabled and the torque provided by the internal combustion engine is only supplied to the permanently driven primary or front axle. The secondary or rear axle, which can be enabled, comprises a second clutch in the form of a separating clutch that is engaged and disengaged together with the all-wheel clutch. There are multiple rotating components between the two clutches, including a connecting shaft leading from the all-wheel clutch to the secondary or rear axle, the components of the all-wheel clutch connected to the connecting shaft on the output side in a torsionally resistant manner, as well as the axle drive of the secondary or rear axle, in addition to the equalization or limited slip differential and the rotating components thereof. In the engaged state of the two clutches, all of these rotating components are driven by the internal combustion engine. If the clutches are disengaged during travel, this leads to the circumstance that the aforementioned components are uncoupled from the drive train and rotate freely. Because the components are decelerated by an applied drag torque, their rotational speed gradually decreases to zero. The drag torque comprises decelerating torque components, which result, among other things, from the oil sloshing of a crown wheel of the axle drive of the secondary or rear axle as well as the bearing friction of the connecting shaft in the pivot bearings thereof, as well as accelerating torque components, which result, among other things, from a rotational speed difference between the input side and the output side components of the oil-filled all-wheel clutch as well as from the friction in the limited slip differential.

Upon the next enabling of the all-wheel drive, the components previously uncoupled from the drive train must be re-accelerated and/or brought back to rotational speed, wherein the necessary acceleration and/or the torque of the internal combustion engine required for acceleration depend(s) on the current rotational speed of the uncoupled components and the applied drag torque.

For this reason, the knowledge of the drag torque applied when the all-wheel drive is disabled is important in order to be able to adapt the rotational speed of the uncoupled and freely rotating or stopped components when the disabled secondary or rear axle is enabled as quickly as possible, on one hand, to the rotational speed of the remaining components of the drive train without this resulting in a noticeable jolt in the drive train and thus in the motor vehicle, on the other hand. In order to achieve enabling with optimum comfort, the acceleration must occur more slowly in other words, the larger the drag torque or the drag losses are that are counteracting an acceleration.

The applied drag torque depends on multiple parameters, namely the rotational speed of the components, the oil level in the clutches and in the axle drive, the temperature of the lubricating oil in the axle drive, as well as on the run-in and/or wear of the bearings and seals. The oil level in the clutches and in the axle drive is known, for example, while the rotational speed and the lubricating oil temperature can be measured. The run-in state and/or wear of the bearings and seals are unknowns that must be estimated. The applied drag torque is determined at present for various driving states as a function of the aforementioned parameters on a test bench and permanently stored in the control unit of the motor vehicle.

In order to save costs however, sensors should increasingly be dispensed with, also including a sensor to measure the lubricating oil temperature in the axle drive of the secondary or rear axle, which can be disabled. However, if further unknowns occur in addition to the run-in and/or wear of the bearings and seals, such as, for example, the lubricating oil temperature or the oil level in the axle drive, a meaningful statement regarding the applied drag torque is hardly even possible.

SUMMARY OF THE DISCLOSURE

Starting from this point, the object of the invention is to improve a method of the aforementioned type to the extent that defects and particularly bearing defects of the rotating components can be determined early on and the applied drag torque can be determined as well without knowing the lubricating oil temperature in the axle drive.

Said object is achieved according to the invention in that, when the all-wheel drive is disabled, the rotational speed of at least one of the uncoupled components is measured in a time interval, and an angular acceleration α of the uncoupled components is determined therefrom, that is the derivative $\dot{\omega}$ of the angular velocity ω of the uncoupled components is determined.

The rotational speed of one of the uncoupled components can be appropriately measured with the aid of a rotational speed sensor, which determines, for example, the rotational speed of the connecting shaft or of a differential cage of the limited slip differential. To the extent that the rotational speed of other uncoupled components differs from the measured rotational speed, it can be easily calculated by means of the known transmission ratio.

Normally, the determined angular acceleration α is a negative angular acceleration, that is a deceleration. When the amount of the negative angular acceleration is above a specified threshold value or range determined previously through test bench tests, one of the uncoupled components is being decelerated excessively, whereby a bearing defect in a bearing of one of the uncoupled components can be inferred early on and it can be replaced accordingly before the bearing is eaten away. The failure to meet a predefined minimum threshold value or range can also point to a defect.

Furthermore, the applied drag torque can be calculated from the determined angular acceleration α, because this depends on the product of the angular acceleration α and the moment of inertia or mass moment of inertia J of the uncoupled components. The moment of inertia or mass moment of inertia J of the uncoupled components does not change over the lifetime of the components and thus can be stored in the control unit as a constant.

Because the uncoupled components move through a rotational speed range during their deceleration, the measurement of the rotational speed advantageously takes place multiple times at different speed sampling points and/or in different speed ranges such that the angular acceleration and the drag torque can be determined for multiple different rotational speeds measured at a time interval. The plausibility or accuracy of the determined angular acceleration and the calculated drag torque can thereby be improved.

The drag torque is preferably calculated according to the relationship $DT=J \times \alpha + AccTconst - DecTconst$, where J is the moment of inertia or mass moment of inertia and α is the angular acceleration of the rotating components, and where AccTconst is a constant accelerating torque and DecTconst is a constant decelerating torque. If DecTconst and AccTconst are known, this results in a linear relationship between the determined angular acceleration and the drag torque calculated therefrom. To the extent that DecTconst and AccTconst are constant, they can be determined on the test bench and stored in the control unit. If the two torques are not completely constant, the variable components can be adapted.

According to a further preferred embodiment of the invention, the pilot control of the torque and thus the acceleration of the uncoupled components takes place upon the subsequent enabling of the all-wheel drive on the basis of the calculated drag torque in order to ensure a jolt-free transition with optimum comfort from the two-wheel drive to the all-wheel drive. In other words, upon active acceleration of the uncoupled components, the torque applied for the acceleration is pilot-controlled as a function of the calculated drag torque. Because the drag torque of the secondary axle is likewise temperature-dependent due to the temperature dependency of the viscosity of the lubricating oil in the axle drive, the calculated drag torque is used then where there should not be a temperature sensor installed nor a model of the change of the drag torque stored in the control unit as a function of the temperature; the calculated drag torque is then only used for pilot control of the drag torque upon the subsequent enabling of the all-wheel drive when the measurement of the rotational speeds and/or the calculation of the drag torque, on one hand, and the enabling of the all-wheel drive, on the other hand, are chronologically close to one another. In this case, it can be assumed that the temperature has not changed or has only changed insignificantly between the measurement and the pilot control.

If the influence of the lubricating oil temperature on the drag torque is known and accordingly a model of the change of the drag torque as a function of the lubricating oil temperature is stored in the control unit, a wear-induced or wear-compensated component of the drag torque can be calculated according to another advantageous embodiment of the invention by comparing the drag torque calculated from the moment of inertia or the mass moment of inertia and the angular acceleration to a reference drag torque stored in the control unit, which was determined at the same temperature on the test bench. There, where no temperature sensor should be installed, the drag torque can be determined at the start of a driving cycle for this purpose, because the lubricating oil temperature and the temperature of the rotating components correspond to the ambient temperature at this time, provided there is a sufficiently long enough service life. The ambient temperature is normally measured in motor vehicles and is thus known so that it can be used by the control unit.

If a model of the change of the drag torque as a function of the temperature is stored in the control unit according to a further advantageous embodiment of the invention, the current lubricating oil temperature in the axle drive of the secondary axle can be calculated or at least estimated based on the calculated wear-induced or wear-compensated drag torque component.

BRIEF DESCRIPTION OF THE DRAWINGS

The invention is explained in more detail in the following by means of an exemplary embodiment shown in the drawing.

DETAILED DESCRIPTION OF THE DRAWINGS

Figure 1:
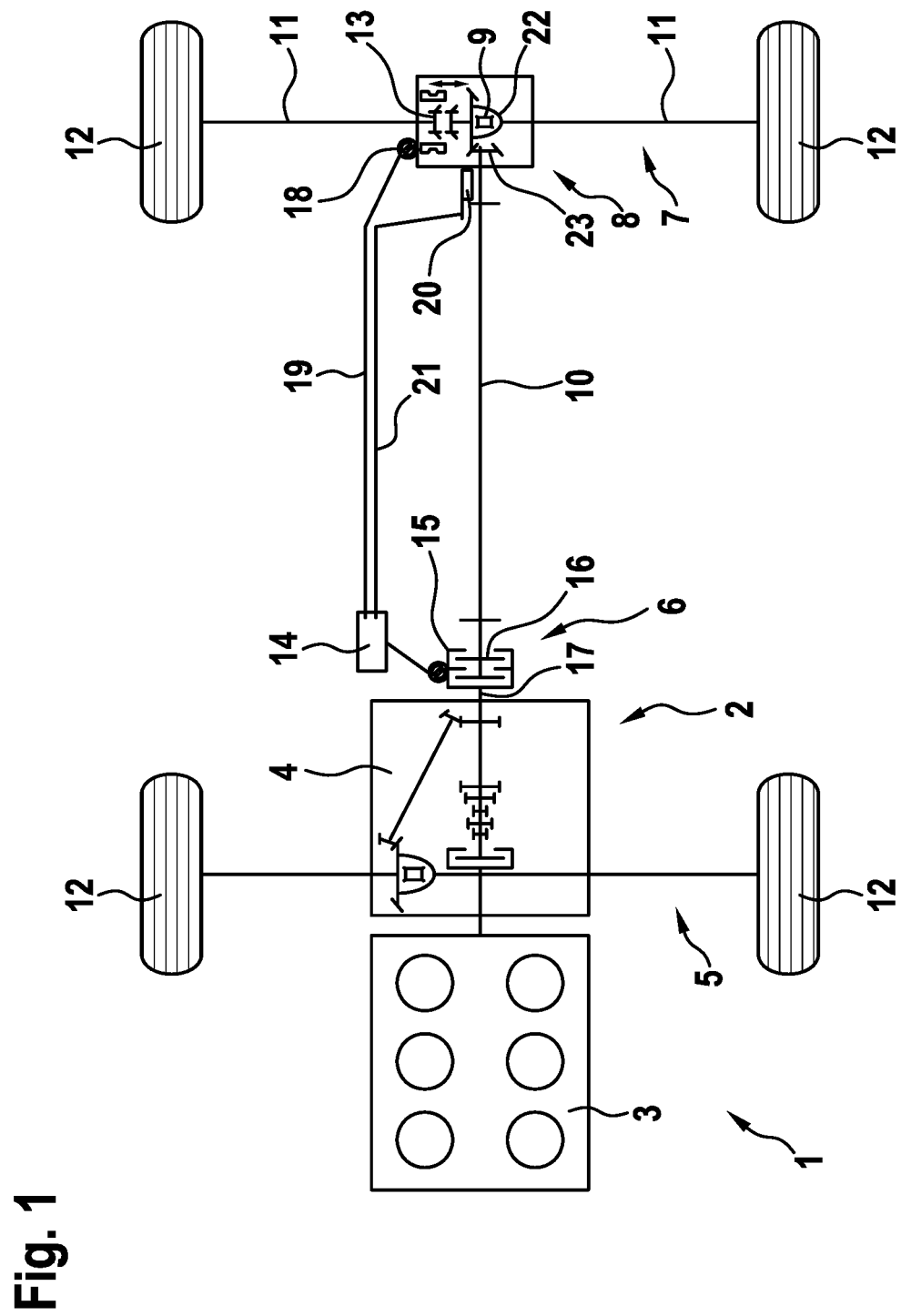
FIG. 1 shows a schematic representation of a drive train of a motor vehicle with an all-wheel drive that can be disabled, in which the rear axle can be enabled and disabled.

The motor vehicle 1 schematically shown in FIG. 1 has a drive train 2 with an internal combustion engine 3 and a gearbox or manual transmission 4 downstream of the internal combustion engine 3. An output of the gearbox 4 is connected to a permanently driven primary axle 5 of the motor vehicle 1, which is the front axle. A further output of the gearbox 4 can be connected to a secondary axle 7 that can be enabled, which is the rear axle, via an all-wheel clutch 6. When the all-wheel clutch 6 is disengaged, the torque of the internal combustion engine 3 is completely applied to the primary axle 5. When the all-wheel clutch 6 is engaged, the torque of the internal combustion engine 3 is distributed both to the primary axle 5 and to the secondary axle 7.

The secondary axle 7 comprises an axle drive 8 with a limited slip differential 9, which is connected to the output side of the all-wheel clutch 6 through a connecting shaft 10 in the form of a universal shaft, two lateral auxiliary cardan shafts 11, which are connected to the wheels 12 of the secondary axle 7 and the limited slip differential 9, as well as a separating clutch 13. The all-wheel clutch 6 and the separating clutch 13 are disengaged and engaged by a control unit 14 of the motor vehicle 1, in order to separate the connecting shaft 10 and the axle drive 8, in addition to the limited slip differential 9, from the gearbox 4 and from the auxiliary cardan shafts 11 in order to disable the all-wheel drive, and/or to connect to the gearbox 4 and the auxiliary cardan shafts 11 upon engagement of the all-wheel drive.

The all-wheel clutch 6 is a friction or disc clutch with two disc packages 15, 16 immersed in an oil bath, of which disc package 15 is connected in a torsionally resistant manner to an output shaft 17 of the gearbox 4 and disc package 16 is connected to the connecting shaft 10 in a torsionally resistant manner. The separating clutch 13 is designed as a dog clutch and comprises a shift element 18, which is connected to the control unit 14 via a control line 19. A rotational speed sensor 20 is attached at the axle drive 8, which measures the rotational speed of a differential cage 22 of the limited slip differential 9 and transmits this to the control unit 14 via a signal line 21.

The enabling and disabling of the all-wheel drive is carried out by the control unit 14 as a function of the respective driving situation. The disabling of the all-wheel drive is used to achieve consumption savings when the all-wheel drive is not required by minimizing the drag torque of the axle drive 8 of the secondary axle 7.

Figure 2:
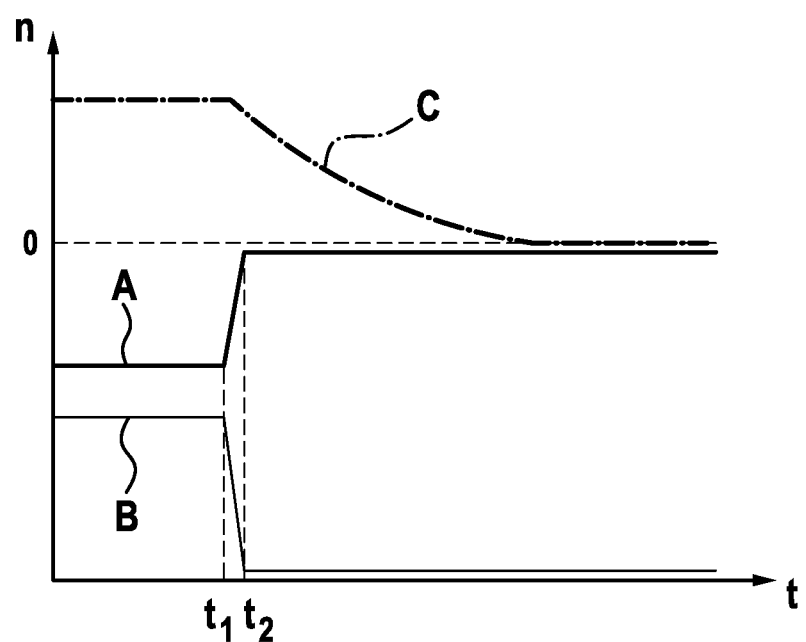
FIG. 2 shows the chronological progression of the rotational speed of a connecting shaft of the drive train after the all-wheel clutch and a separating clutch in the drive train have been disengaged.

When the all-wheel drive is disabled, the engaged all-wheel clutch 6 and the engaged separating clutch 13 are disengaged at time t1, as indicated in FIG. 2 by the two curves A and B. As soon as the all-wheel clutch 6 is completely ventilated and the separating clutch 13 is completely disengaged, as shown in FIG. 2 at time t2, the connecting shaft 10 with the disc packages 16 of the all-wheel clutch 6 as well as the axle drive 8 with the limited slip differential 9 and/or the rotating components thereof are uncoupled from the gearbox 4 on one side and from the auxiliary cardan shafts 11 of the secondary axle 7 on the other side and rotate freely. As a result of the drag torque, which acts upon the uncoupled components 8, 9, 10, 16, the rotational speed n of the connecting shaft 10 subsequently gradually decreases to zero, as shown in FIG. 2 by curve C.

The rotational speed n of the differential cage 22 of the limited slip differential 9, which is measured by the rotational speed sensor 20 in short time intervals $\Delta t$ and is transmitted to the control unit 14 by the signal line 21, also decreases as the rotational speed n of the connecting shaft 10 decreases.

The negative angular acceleration $\alpha$ or deceleration of the differential cage 22 and thus also the connecting shaft 10 as well as the remaining uncoupled components, such as, for example, of the disc package 16 and of a drive unit 23 in the axle drive 8, is calculated in the control unit 14 from the transmitted rotational speeds n and the time intervals $\Delta t$, according to the following relationship:

$$\alpha = \frac{d\omega}{dt} = \dot{\omega}$$

where $\omega$ is the angular velocity of the uncoupled components 10, 16, 22, 23, and $\dot{\omega}$ is the first derivative of the angular velocity $\omega$ over time t or the gradient of angular velocity $\omega$.

If the calculated angular acceleration $\alpha$ after a short debounce time, which depends on the speed and on the longitudinal acceleration of the motor vehicle 1 at time point t1, exceeds a predefined value determined in test bench tests, which indicates that the uncoupled components 10, 16, 22, 23 are being decelerated more quickly than expected, this may point to a defect, whereby there is a high probability of a bearing defect in one of the pivot bearings in the connecting shaft 10.

In addition, the calculated angular acceleration $\alpha$ after the debounce time is associated with a drag torque DT of the secondary axle as follows:

$$\alpha = \frac{DT + DecTconst + AccTconst}{J}$$

where DecTconst is a constant decelerating torque component, AccTconst is a constant accelerating torque component, and J is the moment of inertia or mass moment of inertia of the uncoupled components 10, 16, 22, 23.

DecTconst and AccTconst are determined in test bench tests and stored in the control unit 14. The moment of inertia or mass moment of inertia J of the uncoupled components 10, 16, 22, 23 is known and is likewise stored in the control unit 14.

Thus, the drag torque DT of the secondary axle 7 can be determined in the control unit 14 according to the following relationship:

$$DT = (J \times \alpha) + AccTconst - DecTconst$$

The drag torque DT determined by the control unit 14 can be used in order to optimize the pilot control of the drag torques applied by the internal combustion engine 3 upon the next enabling of the all-wheel drive. If a temperature sensor is not installed in the axle drive 8 and there is no model of the dependency of the drag torque DT on the oil temperature in the axle drive 8 stored in the control unit 14, the time between the measurement of the rotational speeds n being included in the calculation of the drag torque DT and the enabling of the all-wheel drive must not be too long, of course, in order to exclude interim temperature changes.

When the influence of the oil temperature in the axle drive 8 on the drag torque DT is known by preceding test bench tests and the temperature dependency of the drag torque DT is stored in the control unit 14, statements can furthermore be made regarding a portion of the drag torque DT induced by wear or compensated by wear. For this purpose, the measurement of the rotational speeds n as well as the determination of the angular acceleration $\alpha$ and the calculation of the drag torque DT take place at the start of a driving cycle, as long as the temperature of the uncoupled components 10, 16, 22, 23 and of the lubricating oil in the axle drive 8 still correspond to the ambient temperature and thus the oil temperature is known. The calculated drag torque DT is then compared to a reference drag torque DTref determined through test bench tests for the same temperature and stored in the control unit 14. If the calculated drag torque DT exceeds the stored drag torque DTref by a certain amount, this amount corresponds to the wear-induced component of the drag torque DT.

If the wear-induced component of the drag torque does not change with the temperature and the dependency of the non-wear-induced component of the drag torque DT on the oil temperature in the axle drive 8 is stored in the control unit 14, the wear-induced component portion of the drag torque DT can, in turn, be used to make statements regarding the current temperature in the axle drive 8.

Figure 3:
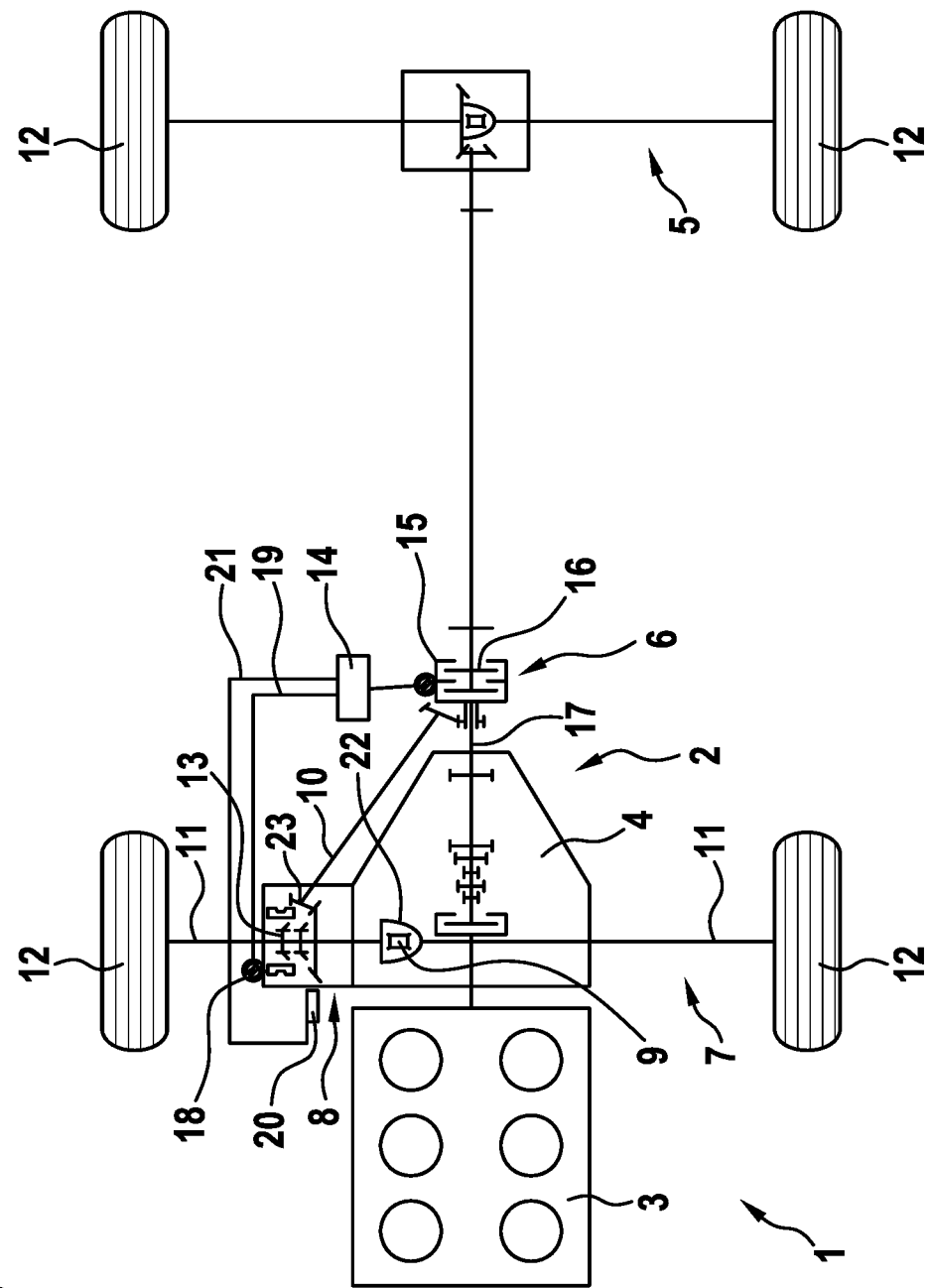
FIG. 3 shows a schematic representation of a drive train of another motor vehicle with an all-wheel drive that can be disabled, in which the front axle can be enabled and disabled.

The motor vehicle 1 schematically shown in FIG. 3 differs from the motor vehicle in FIG. 1 in that the permanently driven primary axle 5 is the rear axle and the secondary axle that can be enabled via the all-wheel clutch 6 is the front axle 7 of the motor vehicle 1. The limited slip differential 9 there is formed as the axle differential and is separated from the axle drive 8. Corresponding parts are characterized by the same reference numbers, as shown in FIG. 1. As previously described, the rotational speed of one of the uncoupled components 10, 16, 22, 23 is measured in a time interval here as well, and an angular acceleration α of the uncoupled components 10, 16, 22, 23 is determined as a result. The remaining previously described method steps are also the same.

The invention claimed is:

1. A method for operating a vehicle, wherein the vehicle comprises:
    an all-wheel drive configured to be enabled and disabled, and a drive train with two clutches actuated by a control unit configured to enable and disable the all-wheel drive, and a plurality of components configured to rotate between the two clutches, the plurality of components configured to be driven when the all-wheel drive is enabled and configured to be uncoupled from the remaining drive train when the all-wheel drive is disabled, wherein the method comprises:
    when the all-wheel drive is disabled, measuring the rotational speed (n) of at least one of the plurality of uncoupled components in a time interval and determining an angular acceleration (a) of the uncoupled components.

2. The method according to claim 1, further comprising indicating a defect when the determined angular acceleration (a) fails to meet or exceeds a predetermined critical threshold value.

3. The method according to claim 1, further comprising calculating a drag torque (DT) on the basis of the determined angular acceleration (α) and a moment of inertia or mass moment of inertia (J) of the plurality of uncoupled components.

4. The method according to claim 3, wherein the drag torque (DT) is calculated for a plurality of different rotational speeds (n) measured in the time interval.

5. The method according to claim 3, wherein the drag torque (DT) is calculated according to the relationship $$DT = J \times \alpha + DecTconst - AccTconst$$

where J is the moment of inertia or mass moment of inertia and a is the angular acceleration of the uncoupled components, where DecTconst is a constant decelerating torque, and AccTconst is a constant accelerating torque.

6. The method according to claim 3, wherein the torque for acceleration is pilot-controlled as a function of the calculated drag torque (DT) upon the next active acceleration of the uncoupled components.

7. The method according to claim 6, wherein the pilot control of the torque for accelerating the uncoupled components is only carried out as a function of the calculated drag torque (DT) when the period of time between the measurements of the rotational speed (n) of at least one of the uncoupled components and the engagement of the all-wheel drive is less than a predetermined period of time.

8. The method according to claim 3, wherein the calculated drag torque (DT) is compared to a stored reference drag torque (DTref) and, as a result, a conclusion is drawn about a wear-induced or wear-compensated component of the drag torque (DT).

9. The method according to claim 8, further comprising determining a current oil temperature in an axle drive from the wear-compensated component of the drag torque (DT).

* * * * *